(12) United States Patent
Fiesel et al.

(10) Patent No.: US 6,752,115 B2
(45) Date of Patent: Jun. 22, 2004

(54) AIR INTAKE DEVICE FOR AN INTERNAL COMBUSTION ENGINE

(75) Inventors: Robert Fiesel, Laupheim (DE); Ingo Koch, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 249 days.

(21) Appl. No.: 10/125,570

(22) Filed: Apr. 19, 2002

(65) Prior Publication Data

US 2002/0179030 A1 Dec. 5, 2002

(30) Foreign Application Priority Data

Apr. 20, 2001 (DE) .......................................... 101 19 280

(51) Int. Cl.[7] .............................................. F02M 35/10
(52) U.S. Cl. .................................................. 123/184.42
(58) Field of Search ..................... 123/184.21–184.61, 123/184.42, 184.47, 184.53, 184.56

(56) References Cited

U.S. PATENT DOCUMENTS 4,653,440 A * 3/1987 Fukuhara et al. ...... 123/184.53
4,660,530 A * 4/1987 Sugiyama et al. .......... 123/432
4,907,547 A * 3/1990 Daly ...................... 123/184.53
5,642,697 A * 7/1997 Jahrens et al. .......... 123/184.21
6,024,066 A * 2/2000 Nakayama et al. ..... 123/184.21
6,357,411 B1 * 3/2002 Aoki ...................... 123/184.24
6,662,772 B1 * 12/2003 Murphy ................. 123/184.21

FOREIGN PATENT DOCUMENTS

DE          199 41 179        3/2000

* cited by examiner

Primary Examiner—Marguerite McMahon
(74) Attorney, Agent, or Firm—Crowell & Moring LLP

(57) ABSTRACT

An intake device for supplying combustion air to an internal combustion engine composed of two sealingly connected half shells (10, 11) which form an intake air plenum (13), intake ducts (14), and a cylinder head flange (15) in which there is an insert (20) associated with each intake duct (14). Each insert is provided with a partition (23) for dividing the flow into two flow cross-sections (21, 22). The first flow cross section (21) is provided with a valve flap (24), which can be opened and closed to influence the filling of combustion chambers of the internal combustion engine.

9 Claims, 3 Drawing Sheets

AIR INTAKE DEVICE FOR AN INTERNAL COMBUSTION ENGINE

BACKGROUND OF THE INVENTION

The invention relates to an intake device comprising an intake air plenum, a plurality of intake ducts, and a cylinder head flange.

Published German patent application no. DE 199 41 179 discloses an intake device for an internal combustion engine, which comprises an accumulator tank with connected intake distributor channels. The intake distributor channels, at their end facing away from the accumulator tank, have a branching area, which forms a single piece together with the intake distributor channel. The branching area divides the cross-section of the intake distributor channel into two separate flow cross sections. An intermediate flange, which is directly connected to a cylinder head, adjoins the intake distributor channels as a separate component. The partitioning of the flow cross sections is continued in the intermediate flange.

To produce defined turbulent flows in a combustion chamber of the internal combustion engine, a flap is arranged in one of the flow cross sections. When the flap seals this flow cross-section, the air flows into the combustion chamber only through the open flow cross section and thereby produces one kind of turbulence. When the flap is open, the air flows into the combustion chamber through both flow cross-sections and produces a different kind of turbulence.

The drawback in this embodiment is the complex manufacture of the intake device with the branching areas in the intake distributor channels. To produce these intake channels requires costly cores or complex half shells, which define the contour of the branching area. This is both expensive and labor intensive.

SUMMARY OF THE INVENTION

The object of the invention is to provide an inexpensive branched intake device that can be manufactured at modest cost.

A further object of the invention is to provide a branched intake device that is simple to manufacture.

These and other objects are achieved in accordance with the present invention by providing an intake device for an internal combustion engine comprising an intake air plenum, a plurality of intake ducts, and a cylinder head flange, in which the intake air plenum communicates between the atmosphere surrounding the internal combustion engine and the intake ducts; each intake duct is connected with the cylinder head flange and associated with a combustion chamber in the internal combustion engine; the cylinder head flange is attached to the internal combustion engine; a divider for separating each intake duct into a first flow cross section and a separate second flow cross section is arranged in the area of the cylinder head flange; a closing element is provided for opening and closing the first flow cross section, and the divider for separating the intake duct into first and second flow cross sections comprises an insert arranged in a recess in the cylinder head flange, and the insert comprises a partition that separates the first flow cross section from the second flow cross section.

The intake device according to the invention for an internal combustion engine comprises an intake air plenum, intake ducts or channels, and a cylinder head flange. This intake device can be formed, for instance, by a single component, which is produced, in particular, by a core melting process or aluminum pressure die casting, or by a multi-part component. The intake air plenum on the one hand communicates with the atmosphere surrounding the internal combustion engine and on the other hand with the intake ducts. Various components used, for instance, to pretreat the air, e.g., an air filter, or to cool components, can be arranged between the intake air plenum and the atmosphere.

The intake ducts coming from the intake air plenum are connected to the cylinder head flange to supply the air from the intake air plenum to the internal combustion engine. Each intake duct is associated with a combustion chamber arranged in the internal combustion engine, which requires the air for combustion. The cylinder head flange is mounted to the internal combustion engine in the area of the cylinder head, particularly by means of screws.

In the area of the cylinder head flange, a divider is provided for separating the intake duct into a first flow cross section and a second flow cross section. The divider for separating the intake duct into a first and a second flow cross section divides the air flowing from the intake air plenum through an intake duct to the internal combustion engine into two partial flows. The flow cross sections can have any contours, e.g., rectangular or oval.

The first flow cross section is designed in such a way that it can be closed and opened by a closing element. This closing element is arranged, for instance, on the cylinder head flange or the cylinder head and communicates with the first flow cross section. The closing element can, for instance, be formed as a flap or a rotary valve.

If the closing element blocks the first flow cross section, only the portion of the air flowing through the second flow cross section can reach the combustion chamber. If the closing element is open, the air from the intake duct can flow through both flow cross sections into the combustion chamber, with the result that the air fills the combustion chamber in a different way.

The divider for separating the intake duct into two separate flow cross sections is formed by an insert, which is arranged in a recess or receptacle in the cylinder head flange and the periphery of which is completely surrounded over its entire height by the recess. This insert can have any outer contour. It may, for instance, have a rectangular configuration. The insert has a partition that separates the first flow cross section from the second flow cross section. This partition has at least the same height as the periphery of the insert. A recess for a separate insert is associated with each intake duct.

Prior to mounting the intake device to the internal combustion engine, the inserts are placed into the recesses. No special fastening elements are required to fix the inserts in the recesses. The use of fastening elements, such as screws, to fix the inserts in the recesses may be useful, however, in some special embodiments. The intake device with its cylinder head flange is sealingly fastened directly to the cylinder head without any intermediate components.

Of course, a sealing element can be provided between the cylinder head flange and the cylinder head. Since no intermediate components, e.g., flanges, need to be clamped between the cylinder head and the cylinder head flange, the fastening elements can be shorter, so that assembly is simplified. Since the cylinder head flange is sealingly connected with the cylinder head both in its peripheral area and between the intake ducts, the insert does not need to be sealed relative to the recess. It is sufficient if the insert rests flat against the recess.

In other embodiments, a sealing ridge may be arranged on the insert, which rests against the recess or is pressed into the recess. A slight leakage flow between the insert and its recess does not affect the function of the intake device.

In one specific embodiment of the invention, the intake air plenum, the intake ducts, and the cylinder head flange are formed by at least two half shells sealingly connected with one another. These half shells are preferably made of a thermoplastic material; glass fiber-reinforced plastics are able to withstand greater loads. In particular embodiments, the half shells can be mechanically connected, e.g., by screws or clamps, with the use of a seal. The first half shell forms the upper part of the intake device, that is, the upper side of the intake air plenum and the upper side of the intake ducts. The second half shell forms the bottom side of the intake device, that is, the bottom side of the intake air plenum, the bottom side of the intake ducts, and the cylinder head flange. Using two half shells allows for simple and cost-effective production of the intake device. The two half shells are also simple to produce since all the contours can be removed from the respective molds using simple cores.

According to a further embodiment of the invention, the partition extends beyond the insert and into the intake duct. This causes the airflow to be separated in the intake duct, so that an earlier and thus better separation of the two partial flows is achieved. The second half shell remains unchanged in its configuration, so that production and demolding are kept simple.

It is advantageous for the partition to have a tapering upstream cross section in order to optimize the air flow. This tapering cross section assures a gentle separation of the airflow into the two partial flows. Very little turbulence is generated as the airflow is divided. This optimizes the flow of the partial airflows and assures that a maximum amount of air is supplied to the internal combustion engine.

A further embodiment of the invention provides that the closing element be arranged in the insert. In this case, the closing element, which, for example, comprises a rotary valve, can be optimally adjusted to the first flow cross section prior to mounting the intake device to the internal combustion engine, so as to achieve an optimal seal of the flow cross section.

According to a further embodiment of the invention, the sealing element is a flap valve or butterfly valve that is centered on a shaft. The closing elements of all intake ducts can be arranged on a single shaft, so that all closing elements change their position simultaneously. This assures that the operating conditions of all combustion chambers correspond and prevents an uneven load distribution.

A further embodiment of the invention provides that each closing element in each insert has its own shaft, and the individual shafts are connected to a single actuating mechanism. The length of the individual shafts is only slightly greater than the first flow cross section. This prevents the shaft from twisting along its length so that the positions of the valves do not correspond. All the shafts are connected to the single actuating mechanism, so that all closing elements are moved synchronously and again the same conditions are created for all combustion chambers.

It is advantageous if the insert is elliptical and the flow cross sections are circular. As a result, the first and second flow cross sections can be circular and the insert requires only one recess, which is only slightly larger than the diameter of the flow cross sections. Furthermore, circular closing elements are better able to seal the first flow cross sections, so that improved tightness and thus improved separation of the two partial streams is achieved.

In one advantageous embodiment of the invention, the insert is manufactured together with the closing element by an assembly injection molding process. First, the outer shape of the insert with the partition is produced from a thermoplastic material. The flap is then injection-molded in place in the cooled and solidified outer shape, such that the outer shape forms part of the injection mold for the flap. The flap optimally conforms to the outer shape and thus compensates all tolerances. As the flap cools, the plastic shrinks slightly, so that the flap becomes movable relative to the other shape.

In a first embodiment, the flap is injection-molded onto a metal shaft, which is inserted into the outer shape before the flap is injection-molded. In a second embodiment, the shaft and the flap form a single piece and can be produced in a single process step. In this case, the shaft ends are molded onto the flap and are supported in the outer shape. The movability of the ends of the shaft, as described above, is assured by the shrinkage of the shaft end material. Assembly-injection-molded inserts make it possible to minimize leakage despite the use of a simple production process.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
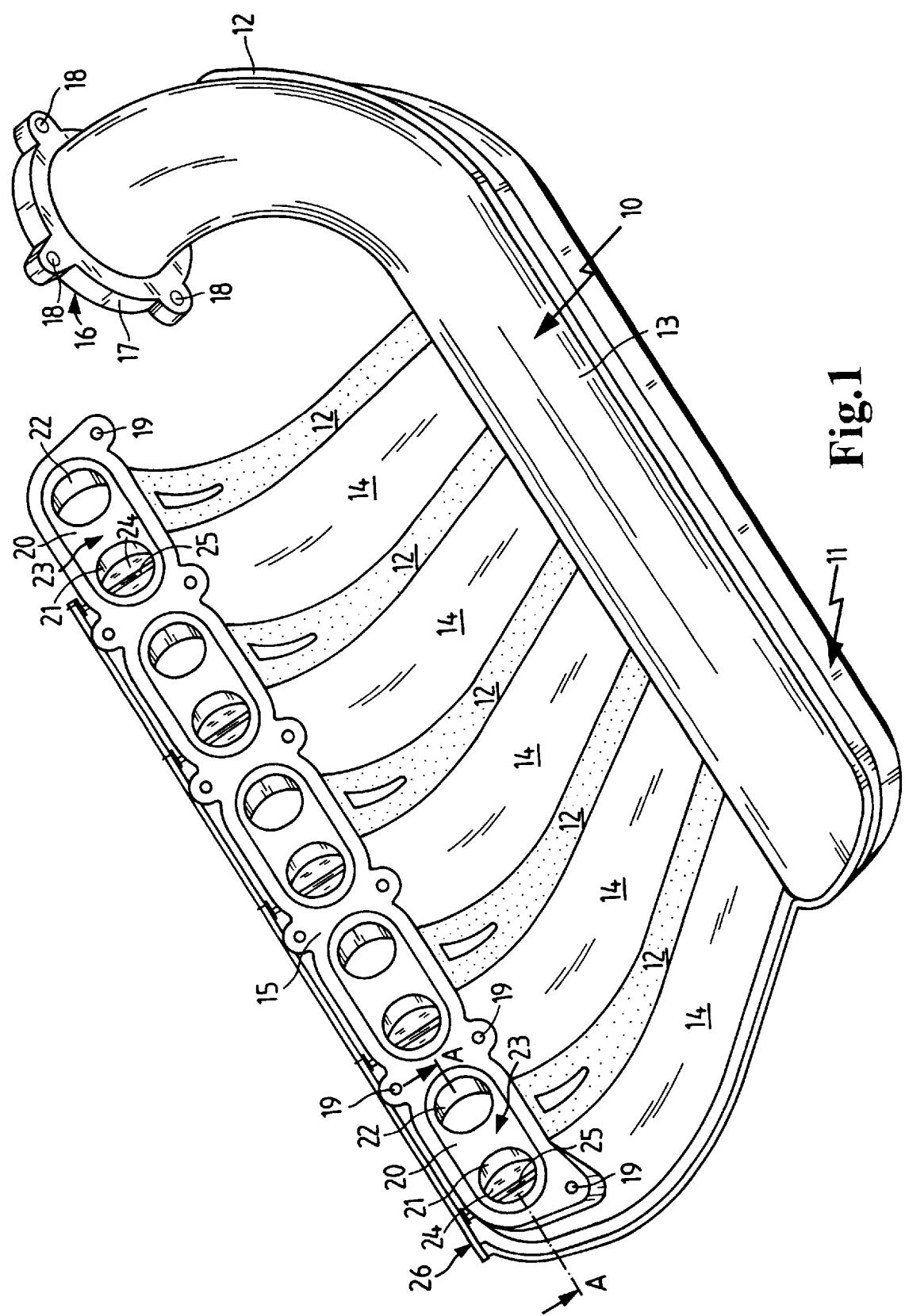
FIG. 1 is a perspective view of an intake device according to the invention.

FIG. 1 shows a perspective view of an intake device for an internal combustion engine. The intake device comprises a lower half shell 10 and an upper half shell 11. The two half shells 10 and 11 are made of glass fiber-reinforced polyamide and are welded together with a circumferential weld seam 12 so as to form a seal. When joined, the two half shells 10, 11 form an intake air plenum 13 and intake ducts 14. The intake ducts 14 extend from the elongated intake air plenum 13 to a cylinder head flange 15.

Weld seams 12 are furthermore arranged between the intake ducts 14 to separate the intake ducts 14 from one another in their longitudinal direction forming a seal. Cylinder head flange 15 is formed exclusively by the lower half shell 10. The two half shells 10 and 11 are produced by injection molding and are designed in such a way that the injection molded half shells 10, 11 can be removed from the mold without any undercuts and the additional work connected therewith.

The intake air plenum 13 has an inlet 16 through which air from the atmosphere can be sucked into the intake device. Since it is disadvantageous to draw in air from a location directly adjacent the internal combustion engine, the inlet 16 with its flange 17 can be connected to an air pipe (not shown).

To fix the air pipe to flange 17, four equally spaced flange bores 18 are provided, allowing screws (not shown) to be inserted and secured with nuts (not shown). As an alternative thereto, self-tapping screws that form their own threads may be used. Furthermore, screws may be screwed into threaded inserts. This makes it unnecessary to secure the screws with nuts. Cylinder head flange 15 also is provided with bores 19 through which fasteners (not shown) can be inserted and secured to a cylinder head (not shown). However, the aforementioned alternatives may also be used.

In cylinder head flange 15, an insert 20 is arranged for each intake duct 14. This insert 20 is oval in shape and is enclosed along its circumference by a cylinder head flange 15. A first flow cross section 21 and a second flow cross section 22 are arranged in insert 20. The two circular flow cross sections 21 and 22 are separated from one another by a partition 23. The first flow cross section 21 is designed to be closed by a flap valve 24. Flap 24 is mounted, preferably centrally, on a shaft 25. Shaft 25 protrudes from insert 20 and from cylinder head flange 15 and is connected to an actuating mechanism 26.

Figure 2:
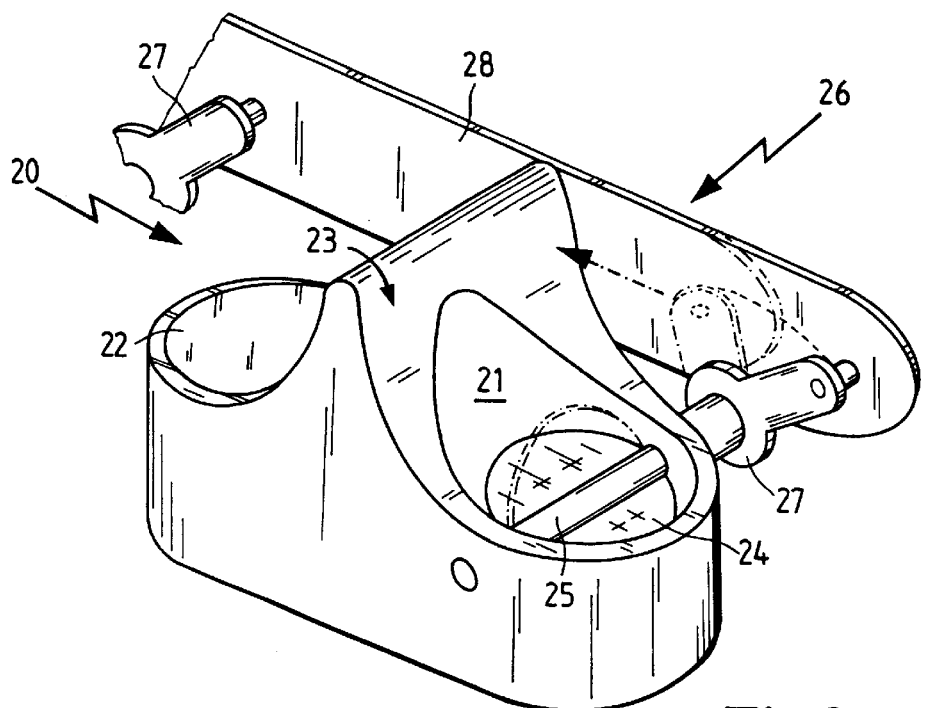
FIG. 2 is a perspective view of an intake device insert.

FIG. 2 is a perspective view of an insert 20 with its actuating mechanism 26, in which flap valve 24 opens and closes the first flow cross section. Components that correspond to those shown in FIG. 1 are provided with the same reference numerals. Insert 20 is made of synthetic resin material (i.e., plastic) and is produced by injection molding. On the outside of insert 20, shaft 25 is fixedly connected with a lever 27. Lever 27 together with a rod 28 forms the actuating mechanism 26. Lever 27 is connected with rod 28 such that the movement of the rod is translated into a rotary movement of lever 27 and/or flap 24.

If rod 28 is moved in the direction, or against the direction, of the arrow, the position of flap 24 is changed. In the illustrated insert 20, flap 24 is in its closed position. By moving the rod in the direction of the arrow, flap 24 is moved to its open position. Depending on how far the rod is moved, flap 24 opens the first flow cross-section 21 completely or only partially. When flap 24 is completely open, flap 24 and shaft 25 remain inside the first flow cross section 21.

In this embodiment the shafts 25 of all inserts are connected to the same rod 28, so that all flaps 24 are moved synchronously. To this end, flaps 24 must be aligned along rod 28 such that all flaps 24 have the same angle of inclination. As a result, all flaps 24 are closed or opened simultaneously. However, the flaps 24 of the individual inserts 20 can also be moved by separate actuating mechanisms 26, which are not interconnected.

Figure 3:
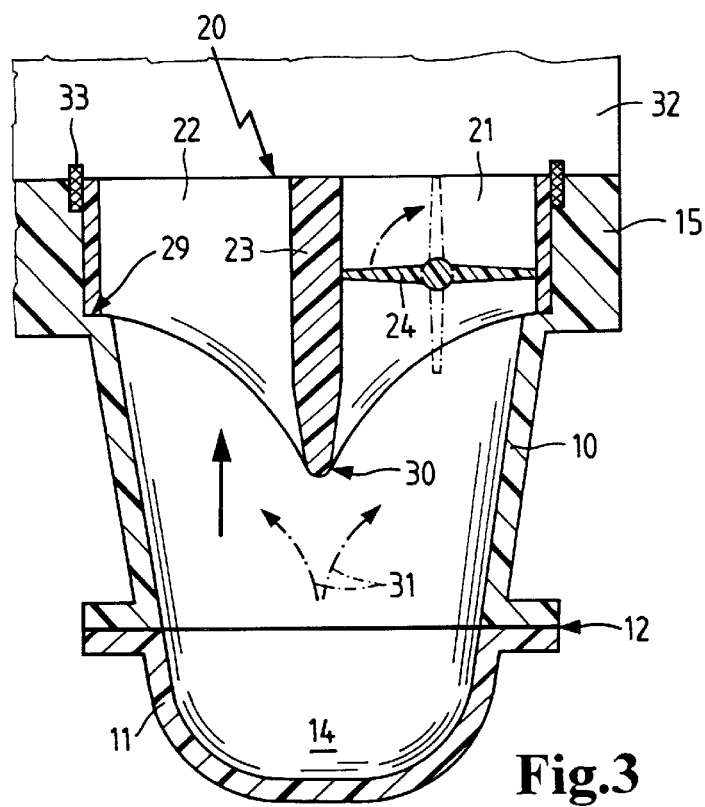
FIG. 3 is a detail view of the intake device of FIG. 1.

FIG. 3 shows a detail of an intake device along a section line A—A according to FIG. 1. Components corresponding to those shown in FIG. 1 are provided with the same reference numerals. Section line A—A runs through the center of insert 20 and the surrounding cylinder head flange 15. In this illustration, the weld seam 12, which connects the upper half shell 11 with the lower half shell 10, is clearly visible. This weld seam 12 may be produced, for instance, by vibration welding. Of course, welding edges (not shown) may be provided for fusing.

Insert 20 is placed into a recess 29 arranged in cylinder head flange 15. Recess 29 is configured in such a way that insert 20 on the side facing the internal combustion engine is flush with cylinder head flange 15 and does not protrude beyond it. On the opposite side, facing away from the internal combustion engine, partition 23 protrudes into intake duct 14 and thus divides the airflow. Partition 23 has a cross section 30 that tapers against the flow direction so as to achieve a low-turbulence flow separation into two partial flows.

When flap 24 is closed, the air can flow only in the direction of the arrow through the unobstructed cross-section 22. To unblock the first flow cross section 21, flap 24 is rotated as indicated by the unnumbered broken line arrow. When flap 24 is in the open position (shown in broken lines), the first flow cross section 21 is also open for the air flowing toward the internal combustion engine. This causes the airflow from intake duct 14 to be divided as indicated by the broken line arrows 31.

The cylinder head flange 15 is sealingly connected with a cylinder head 32 (shown schematically) of an internal combustion engine. For this sealing connection, a seal 33 is provided, which extends directly around insert 29 and thus seals each insert 20 relative to cylinder head 32. In an alternative embodiment, each flow cross section 21 and 22 may be provided with its own circumferential seal 33, in which case the two seals 33 can be connected.

Figure 4:
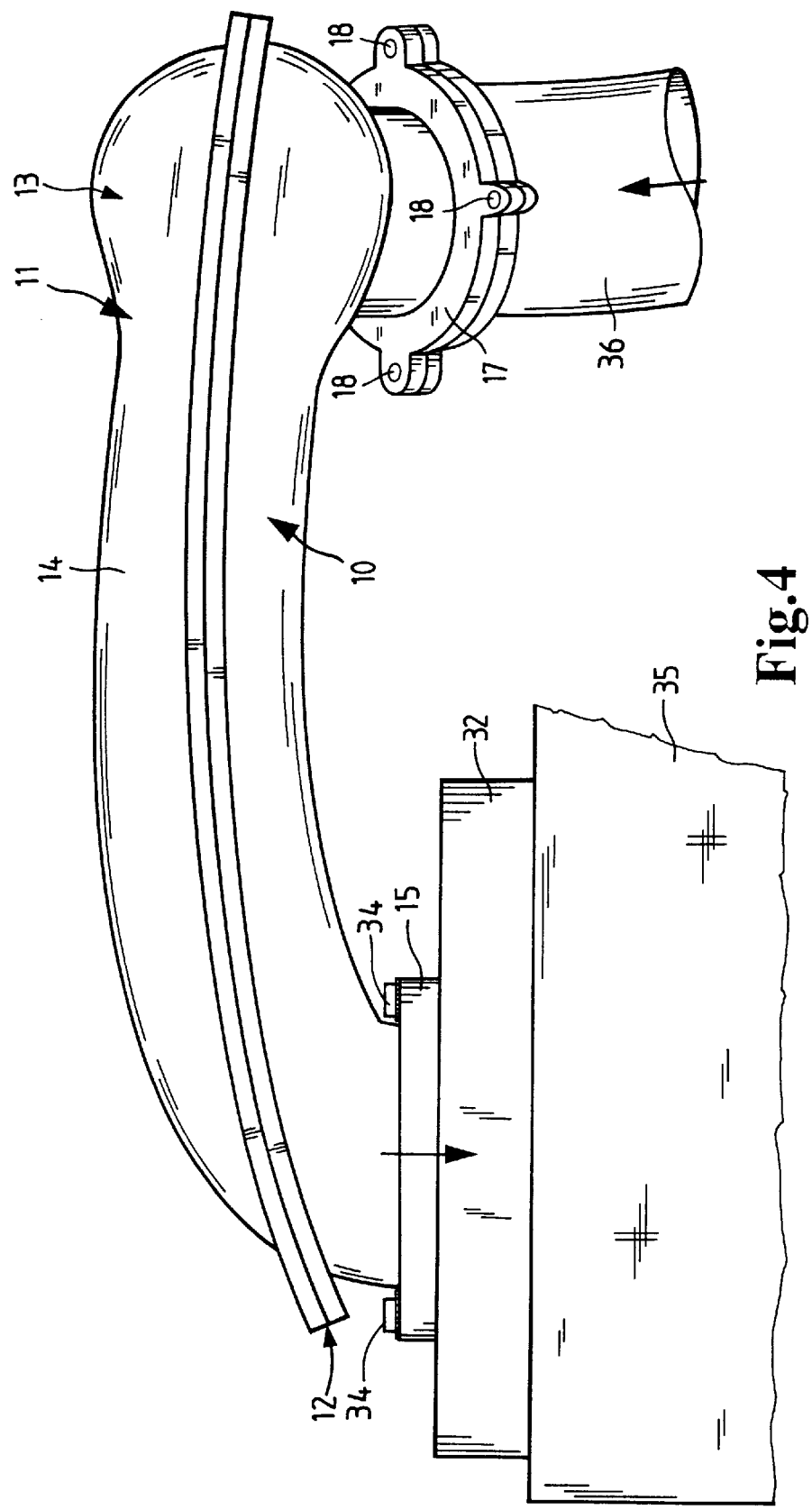
FIG. 4 is a schematic representation of an intake device constructed in accordance with the invention.

FIG. 4 is a schematic representation of the intake device. Components corresponding to those shown in FIG. 1 are provided with the same reference numerals. The intake device is fastened to the cylinder head 32 of an internal combustion engine 35 by screws 34. On the inlet side of the intake device, an air pipe 36 is secured to flange 17. Air pipe 36 transports the air from the atmosphere to the intake device.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake device for an internal combustion engine, said device comprising an intake air plenum, a plurality of intake ducts, and a cylinder head flange, wherein the intake air plenum communicates between the atmosphere surrounding the internal combustion engine and the intake ducts;

each intake duct is connected with the cylinder head flange and associated with a combustion chamber in the internal combustion engine;

the cylinder head flange is attached to the internal combustion engine;

a divider for separating each intake duct into a first flow cross section and a separate second flow cross section is arranged in the area of the cylinder head flange;

a closing element is provided for opening and closing said first flow cross section, and the divider for separating the intake duct into first and second flow cross sections comprises an insert arranged in a recess in the cylinder head flange, and said insert comprises a partition that separates the first flow cross section from the second flow cross section.

2. An intake device according to claim 1, wherein the intake air plenum, the intake ducts, and the cylinder head flange are all formed by two sealingly connected half shells.

3. An intake device according to claim 1, wherein each partition extends into the associated intake duct.

4. An intake device according to claim 1, wherein each partition has a tapering upstream cross section for optimizing air flow.

5. An intake device according to claim 1, wherein the closing element is arranged in the insert.

6. An intake device according to claim 5, wherein the closing element is a flap valve arranged on a shaft.

7. An intake device according to claim 6, wherein the shafts of the inserts of each intake duct are connected to a single actuating mechanism.

8. An intake device according to claim 4, wherein the insert is elliptical, and the flow cross sections are circular.

9. An intake device according to claim 1, wherein the insert is manufactured together with the closing element by assembly injection molding.

* * * * *